May 6, 1941.  W. J. SNOVER  2,241,277

HAND BRAKE SIGNAL

Filed Nov. 7, 1939  2 Sheets-Sheet 1

Inventor

W. J. Snover

By Clarence A. O'Brien
and Hyman Berman
Attorneys

May 6, 1941.   W. J. SNOVER   2,241,277
HAND BRAKE SIGNAL
Filed Nov. 7, 1939   2 Sheets-Sheet 2
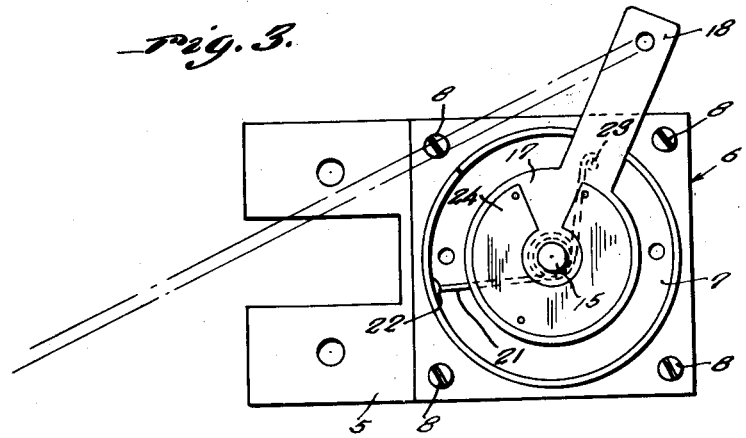
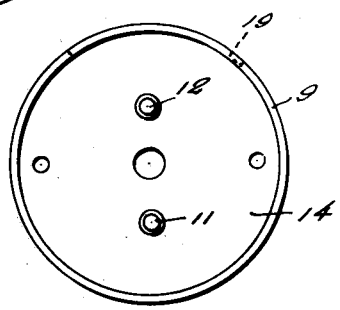
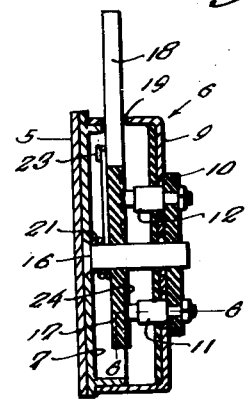
Inventor
W. J. Snover
By Clarence A. O'Brien
and Hyman Berman
Attorneys Patented May 6, 1941

2,241,277

UNITED STATES PATENT OFFICE 2,241,277

HAND BRAKE SIGNAL

William J. Snover, Spencer, Ind., assignor of one-half to Leason Taylor, Spencer, Ind.

Application November 7, 1939, Serial No. 303,305

1 Claim. (Cl. 200—59)

The present invention relates to new and useful improvements in hand brake signals for automobiles and has for its primary object to provide, in a manner as hereinafter set forth, a device of this character embodying novel means for automatically indicating to the operator of the vehicle when the hand brake is on.

Another important object of the invention is to provide a hand brake signal of the aforementioned character which functions only when the ignition switch of the vehicle is closed.

Still another very important object of the invention is to provide a hand brake signal or indicator of the character described which may be expeditiously installed for operation without the necessity of making material structural alterations in the vehicle.

Still another very important object of the invention is to provide an automatic signal or indicator of the aforementioned character which is adapted for connection with hand brake levers which are located beneath the instrument panel of the automobile.

Other objects of the invention are to provide a hand brake signal or indicator for automobiles which will be comparatively simple in construction, strong, durable, compact, reliable in operation and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in side elevation of the switch with the removable section of the housing omitted.

Figure 4 is a detail view in elevation of the removable housing section, looking at the interior thereof.

Figure 5 is a cross sectional view through the switch.

Figure 7 is a diagrammatic view of the electric circuit.

Figure 1:
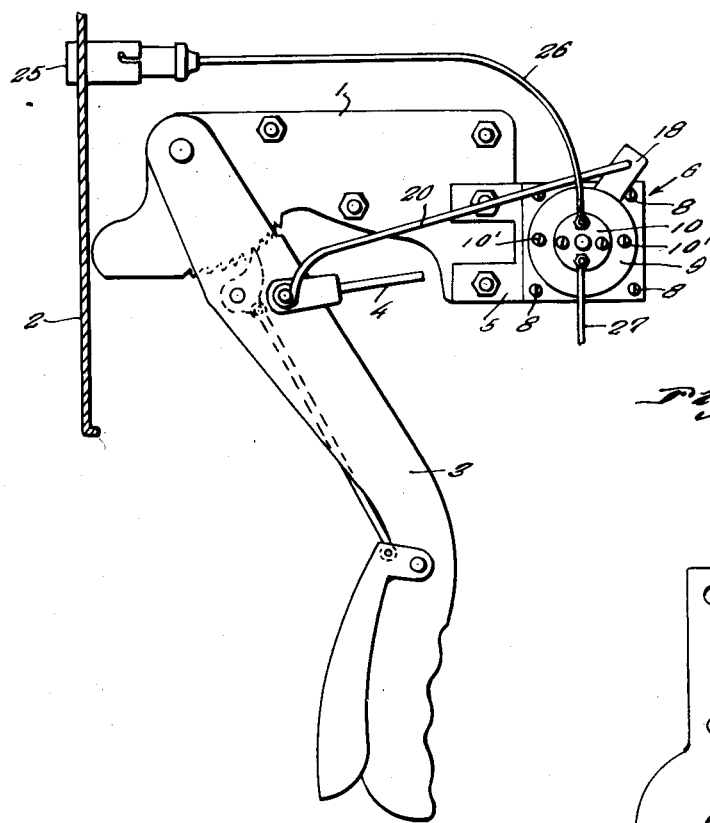
Figure 1 is a view in side elevation of a signal constructed in accordance with the present invention, showing the device connected to the hand brake lever of an automobile.
Figure 8:
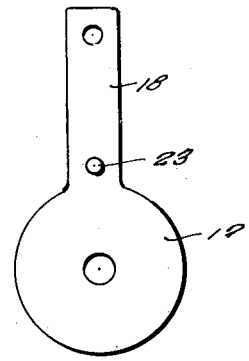
Figure 8 is a detail view in side elevation of the rotary switch member.
Figure 2:
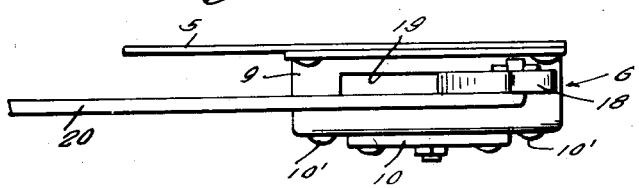
Figure 2 is a top plan view of the switch.

Referring now to the drawings in detail, it will be seen that the reference numeral 1 designates a bracket which, as usual, is mounted beneath the cowl of the automobile forwardly of the instrument panel 2. Pivotally mounted on the bracket 1 and depending therefrom is a hand brake lever 3. The lever 3 extends below the horizontal plane of the instrument panel 2 in a manner to facilitate manual operation of said lever. The usual brake operating cable 4 is connected to the lever 3.

The embodiment of the present invention which has been illustrated comprises a bracket 5 in the form of a metallic plate which is rigidly secured on the forward end portion of the brake lever bracket 1'. It will be observed that certain of the bolts which secure the bracket 1 in position are utilized to mount the bracket 5 on said bracket 1. Mounted on the bracket 5 is a switch which is designated generally by the reference numeral 6.

The switch 6 includes a stationary housing section 7 which is permanently secured, as at 8, on the bracket 5. Mounted on the housing section 7 is a removable section 9 which is secured by bolts 10'.

Figure 6:
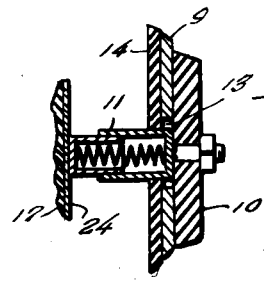
Figure 6 is a fragmentary view in vertical section through a portion of the switch, taken substantially on the line 6—6 of Fig. 5.

Firmly secured on the exterior of the housing section 9 is a disk 10 of suitable insulating material. Mounted on the disk 10 and projecting into the housing 6 through openings provided therefor in the section 9 of said housing are brushes 11 and 12. As best seen in Fig. 6 of the drawings, the openings in the housing section 9 which accommodate the brushes 12 are sufficiently large to clear said brushes. These openings are designated by the reference numeral 13. Mounted in the housing section 9 is an insulating sheet 14 through which the brushes 11 and 12 pass.

Mounted transversely in the housing 6 is a centrally located pin or shaft 15. The shaft 15 includes a headed end portion 16 which is countersunk in the housing section 7. The other end portion of the shaft 15 extends through aligned openings which are provided therefor in the insulating sheet 14, the housing section 9 and the disk 12. The construction and arrangement is such that the housing section 9 may be removed from the section 7 upon removal of the bolt or screws 10'.

Journaled on the shaft 15 in the housing 6 is a rotor 17 in the form of a disk of suitable insulating material. Projecting radially from the rotor 17 is an integral arm 18 which is operable in a circumferential slot 19 which is provided therefor in the periphery of the housing section 9. A rod 20 has one end pivotally connected to the hand brake lever 3 and its other end pivotally connected to the free end portion of the arm 18 for actuating the rotor 17. Mounted on the shaft 15 is a spring 21 having one end anchored to the housing 6, as at 22. The other end portion of the spring 21 is engaged with a pin or lug 23 on the inner portion of the arm 18 for yieldingly resisting rotation of the rotor 17 by the lever 3. Countersunk in one face of the rotor 17 is a segmental contact 24 for engagement by the brushes 11 and 12.

Mounted on the instrument panel 2 of the vehicle is an electric signal light 25. A conductor 26 electrically connects the light 25 with the brush 12 of the switch 6. A conductor 27 electrically connects the brush 11 with the ignition switch 28 (see Fig. 7) of the vehicle.

It is thought that the operation of the device will be readily apparent from a consideration of the foregoing. The brush 11 is engaged with the contact 24 at all times. When the hand brake lever 3 is in off position, as when the vehicle is in motion, the rotor 17 is in the position shown in Fig. 3 of the drawings, in which position the brush 12 is engaged with the rotor 17 between the ends of the segmental contact 24. Thus, the electric circuit to the signal light 25 is open. When the hand brake lever 3 is swung rearwardly to on position the rotor 17 is rotated through the medium of the rod 20 for bringing the contact 24 into engagement with the brush 12. Thus, with the ignition switch 28 closed the signal lamp 25 will be energized for clearly indicating to the operator of the vehicle that the hand or emergency brake is on. Of course, when the ignition switch 28 of the vehicle is open the signal light 25 will not function at any time.

It is believed that the many advantages of a hand brake signal or indicator constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A hand brake signal comprising a bracket, a housing including a stationary section mounted on said bracket, a shaft including a head on one end countersunk in the stationary section, said head abutting the bracket and being retained thereby in the stationary section of the housing, said housing further including a removable substantially cup-shaped section adapted to be slipped on the stationary section and on the other end portion of the shaft, said removable section having a circumferential slot therein, a rotor of insulating material journaled on the shaft in the housing, an actuating arm projecting radially from said rotor and operable in the slot, a segmental contact mounted on the rotor, a disc of insulating material mounted on the exterior of the removable housing section and slidable on said other end portion of the shaft, and brushes mounted on said disc and extending therefrom into the housing through the removable section and engageable with the contact on the rotor.

WILLIAM J. SNOVER.